United States Patent [19]
Inoue

[11] 3,878,352
[45] Apr. 15, 1975

[54] ELECTRICAL DISCHARGE MACHINE WITH EVOLVED-GAS DETOXIFICATION

[75] Inventor: Kiyoshi Inoue, Tokyo, Japan

[73] Assignee: Inoue-Japax Research Incorporated, Yokohama, Japan

[22] Filed: Apr. 22, 1974

[21] Appl. No.: 463,102

[30] Foreign Application Priority Data
Apr. 21, 1973 Japan.................. 48-61893
Aug. 21, 1973 Japan.................. 48-61879

[52] U.S. Cl. ........................... 219/69 D; 219/69 M
[51] Int. Cl................................................... B23p 1/08
[58] Field of Search ............ 219/69 D, 69 M, 69 R; 204/224 M, 238, 235, 276

[56] References Cited
UNITED STATES PATENTS
| | | | |
|---|---|---|---|
| 2,785,279 | 3/1957 | Williams | 219/69 D |
| 2,937,124 | 5/1960 | Vaughn | 204/224 M |
| 3,255,097 | 6/1966 | Williams | 204/238 |
| 3,553,415 | 1/1971 | Girard | 219/69 D |

*Primary Examiner*—Bruce A. Reynolds
*Attorney, Agent, or Firm*—Karl F. Ross; Herbert Dubno

[57] ABSTRACT

An electrical discharge machining apparatus in which an electrode is juxtaposed with a workpiece across a gap filled with a dielectric liquid is provided with means for collecting gases from immediately above the surface of the dielectric liquid, evaluating these gases and detoxifying them by rendering them noncombustible and nonexplosive and nonhazardous to life.

9 Claims, 2 Drawing Figures

ELECTRICAL DISCHARGE MACHINE WITH EVOLVED-GAS DETOXIFICATION

FIELD OF THE INVENTION

The present invention relates to an electrical-discharge machine incorporating a safety arrangement which performs both anti-pollution and fire-preventing functions.

BACKGROUND OF THE INVENTION

In an electrical-discharge-maching machine, a tool electrode and a workpiece are juxtaposed in a dielectric liquid contained in a work tank and a succession of electrical discharges are produced across a machining gap between the tool electrode and the workpiece to electrophysically remove material from the workpiece.

The dielectric liquid serving as the discharge medium is typically kerosine (paraffin oil), transformer oil, machine oil or a like liquid hydrocarbon and is thermally vaporized and decomposed by discharge energy into gaseous constituents including gaseous hydrocarbons, hydrogen and carbon monoxide which are emitted from the work tank. These gaseous products are not favorable to human health and act to contaminate air in the environment of the site in which the machines are installed and operated.

Furthermore, such evolved gases are combustible and are reactive with oxygen in air immediately aboved the liquid surface in the work tank so that an accidental sparking in the air or in the vicinity of the liquid surface or as a result of a drop in the level of the liquid surface or an excessive upward travel of the tool electrode may well lead to a fire in the work tank which may even spread to the shop building in which the machine is installed. Thus, conventional electrical discharge machines always involve a possible danger of fire and the problem of air pollution.

OBJECT OF THE INVENTION

It is the object of the present invention therefore to provide an improved electrical discharge machine whereby the above-mentioned problems associated with conventional equipment are overcome.

SUMMARY OF THE INVENTION

According to the present invention, an electrical discharge machine includes a work tank for receiving a machining liquid in which electrical-discharge machining is carried out across a machining gap in the usual manner, the machine further including cover or hood means associated with said work tank for defining a chamber with the surface of the machining liquid and collecting in said chamber discharge-produced fluid evolved from the machining gap. Conduit means communicates between said chamber and the atmosphere, while suction means is provided in the conduit means for drawing gas fluid from said chamber and maintaining the latter at a sub-atmospheric pressure. Fluid-clarifying (gas transformation) means in the conduit means converts the fluid drawn from said chamber into nonnoxious gas and permits the latter to be discharged into the atmosphere.

The cover means may be any means such that the chamber defined thereby with the surface of the body of the machining liquid in the work tank is substantially hermetically sealed from the ambient atmosphere and discharge-produced fluid rising from the machining gap, e.g. hydrogen, carbon monoxide and gaseous hydrocarbons, is substantially confined within said chamber without premature release to the ambient atmosphere. The term "substantially" is used herein to refer to the fact that the seal may not necessarily be perfectly hermetic to enable the system to be effective and render it practical.

The suction means incorporated in the conduit means, which is provided to communicate the chamber with the atmosphere, as set forth, may embody a blower, vacuum pump or compressor of suitable conventional design. Alternatively, it may make use of an appropriate aspirator arrangement in which case part of machining liquid pumped toward the work tank may be utilized as an aspirating liquid for the gaseous fluid from said chamber to entrain the same into a service tank in which machining liquid is stored for supply to the work tank and wherein gaseous hydrocarbons, hydrogen and any other gaseous matter drawn are separated from the liquid and any solid matter, are bubbled through the body of the liquid to the surface, and are collected above the liquid surface. The suction means may thus be any negative pressure means effective to maintain the pressure of the chamber at a sub-atmospheric level limiting the oxygen content therein to a level at which usually combustible discharge-produced fluid is incapable of combustion.

The fluid-clarifying means may be an exhaust reactor of conventional design and may be of the type used with automobiles. It may include a bed of activated carbon or metal catalyst in particulate form, preferably with a heater unit, designed to oxidize the collected gas and discharge it to the atmosphere as nontoxic and noncombustible air.

BRIEF DESCRIPTION OF THE DRAWING

These and other features and advantages of the invention will become more readily apparent from the following description thereof, reference being made to the accompanying drawing in which.

SPECIFIC DESCRIPTION

Figure 1:
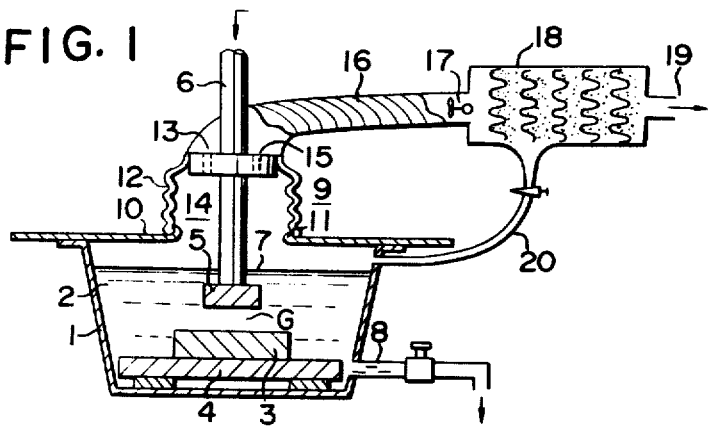
FIG. 1 is a diagrammatic view essentially in elevational cross-section of an arrangement embodying the present invention.

Referring to FIG. 1, there is shown a work tank 1 containing a machining liquid 2, i.e. kerosine (paraffin oil) or a like electrical-discharge machining oil in which a workpiece 3 is immersed and securely mounted on a work support 4.

Juxtaposed with work piece 3 in the machining liquid 2 is a tool electrode 5 which is secured to an electrode holder or spindle 6, is movable therewith upwardly and downwardly and in the course of an electrical-discharge machining operation is advanced toward work piece 3 by a servomechanism as machining proceeds.

The servomechanism, which may of the type described in U.S. Pat. No. 3,781,507, issued Dec. 25, 1973, also responds to short-circuiting or arcing condition which may develop across machining gap G to retract tool electrode 5 away from workpiece 3 until such condition is removed.

Tool electrode 5 is formed with a central bore (see U.S. Pat. No. 3,604,885, issued Sept. 14, 1971) which is open at the machining end surface thereof and adapted to continuously or intermittently supply machining liquid which is drawn from a reservoir or service tank (not shown) to machining gap G to carry away machining detritus therefrom, the liquid being circulated and returned to the reservoir through a drain pipe 8, shown here provided at the bottom of work tank 1.

Each time a discharge is produced across machining gap G, an amount of machining liquid 2 in decomposed into gaseous constituents including hydrogen, carbon monoxide and hydrocarbons, which rise to the surface of machining liquid 7 and are released to above the liquid surface 7. These gases are not only hazardous to the human health but are capable of combustion. Thus, if an arcing condition has developed at machining gap G and continued to the extent that tool electrode 5 is retracted and the arc discharge is drawn up to the region of liquid surface 7, it will suffice to ignite combustion of machining liquid 2 and develop a fire. To cope with such a possible danger, various measures have heretofore been proposed, including provision of a fire detector and extinguisher arrangement which has, however, been unsatisfactory and often unsuccessful to prevent development of fire at an early stage.

In accordance with the present invention work tank 1 is provided with cover means which is generally represented by numeral 9.

Cover means 9 includes a plate 10 composed of heat-resistant plastic or metal, adapted to cover and abut against the upper rim portion of work tank 1 and having a central aperture 11 through which spindle 6 may pass.

Spindle 6 is shown here surrounded by a bellows-type sleeve 12, composed of flexible and heat-resistant material, whose lower end is secured to plate 10 along the rim of aperture 11 and whose upper end is secured to a flange 13 fixedly attached to spindle 6 so that a space or chamber 14 is formed above liquid surface 7 and is hermetically sealed from the ambient atmosphere to prevent escape of the discharge-produced fluid to the environment.

Flange 13, as part of cover means 9 according to the present invention, has here fluid passages 15 perforated therethrough and is securely received by one end of the conduit 16 in which a blower 17 is shown provided as suction means to draw the fluid contained and collected in chamber 14 through passages 15 and hold the pressure within chamber 14 at a sub-atmospheric level. The oxygen content in chamber 14 is also drawn to create a condition whereby the possibility of combustion therein is eliminated. The fluid is drawn into a fluid-clarifying filter 18 which may contain a bed of catalyst, e.g. particulate activated carbon, copper oxide, chromium oxide, barium oxide, ruthenium, platinum, nickel, aluminum oxide or the like, where gaseous hydrocarbons, hydrogen and carbon monoxide from chamber 14 is converted into clean air which contains $H_2O$ and $CO_2$ and is discharged into the environment through an exit duct 19. Filter 18 also functions to separate from gaseous substances an oil content in the fluid which is returned to work tank 1 through a return pipe 20. Filter 18 preferably contains a heater (see patent mentioned below) to facilitate oxidation and gas clarification. A suitable catalytic gas reformer is described in U.S. Pat. Nos. 3,503,716 and 3,775,064.

Figure 2:
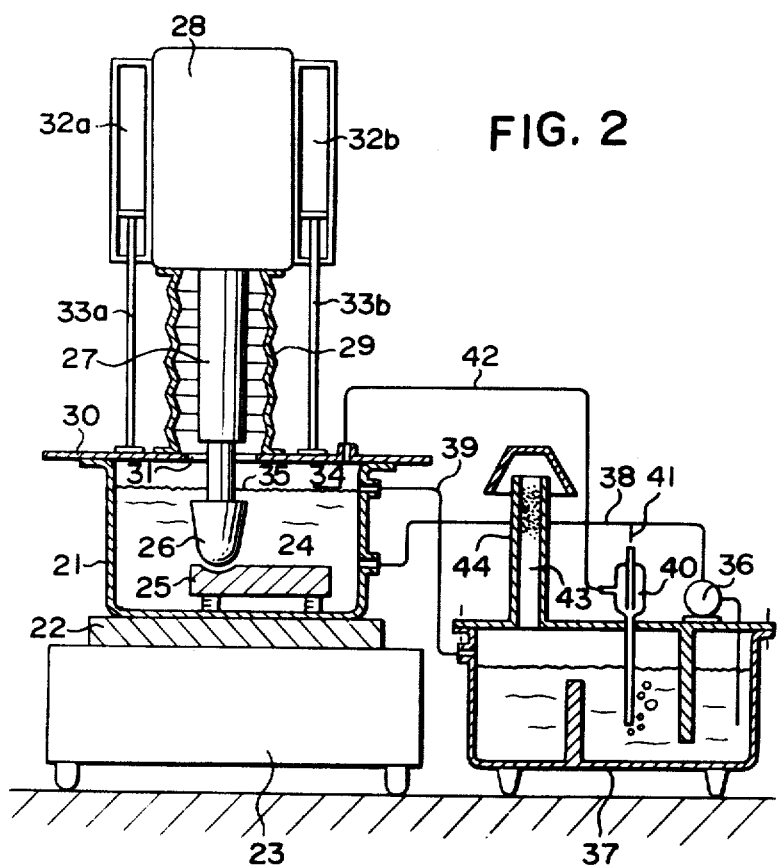
FIG. 2 is a diagrammatic elevational cross-sectional view of another embodiment of the invention.

In FIG. 2, which illustrates another embodiment of the invention, a work tank 21 is shown mounted securely on a table 22 which in turn is movably mounted on a base 23. Work tank 21 here again contains a machining liquid 24 in which a workpiece 25 is positioned and shown spacedly juxtaposed with a tool electrode 26 to form a machining gap G therebetween. Tool electrode 26 is mounted upon an electrode holder or spindle 27 movably extending from a machine head 28 which carries an electrode feed servomechanism, as noted previously.

In this embodiment, a bellows-type sleeve 29 attached to a work tank cover plate 30 at its one end is secured to machine head 28 at its other end, surrounding spindle 27 which is here again accommodated through an aperture 31 of cover plate 30.

Attached to machine head 28 are a pair of hydraulic cylinders 32a and 32b associated with their respective piston rods 33a and 33b, and these rods are secured to cover plate 30 and arranged to move up and down to lift and lower plate 30 relative to machine head 28. The hydraulic system is thus operated to lift up cover plate 30 to permit tool electrode 26 and workpiece 25 to be positioned as desired for a given machining operation and then to lower plate 30 to thereby cover work tank 21 to form and maintain a hermetically sealed chamber 34 above liquid surface 35 during the machining operation.

During machining operation, a pump 36 supplies machining liquid into work tank 21 from a reservoir or service tank 37 via an inlet line 38 to maintain liquid surface 35 in the work tank at an appropriate level, the machining liquid carrying machined chips being withdrawn via an outlet line 39 and returned to reservoir 37. The chips and other impurities are of course removed from the machining liquid prior to entry into work tank 21 by a filter (see U.S. Pat. No. 3,594,299, issued July 20, 1971) which is incorporated in the circulation system in the usual manner.

In this embodiment, the suction means makes use of an aspirator arrangement having a first inlet 41 connected with liquid outlet 38 and a second inlet 42 communicated with chamber 34. Part of machining liquid from pump 36 is introduced into aspirator 40 via inlet 41 where it serves to entrain fluid contained and collected in chamber 34 into reservoir 37 and to maintain pressure within chamber 34 at a sub-atmospheric level. The oxygen content therein is thus restricted to a level insufficient to permit combustion.

In reservoir 37, the gaseous component from chamber 34 separates from mist and, in the form of bubbles, rises to the liquid surface. The reservoir tank 37 has a seal cover 43 to collect the gases released from the liquid and is provided with an exit duct 43 carrying a catalyst bed 44 to convert the collected gaseous hydrocarbons, hydrogen and carbon monoxide into a clean air for discharge into the atmosphere.

I claim:

1. An electrical-discharge machine including:
    a work tank for receiving a machining liquid in which electrical discharge machining is carried out across a machining gap;
    cover means associated with said work tank for defining a chamber with the surface of said machining liquid and collecting in said chamber discharge-produced fluid evolved from said machining gap;

conduit means communicating said chamber with the atmosphere;

suction means in said conduit means for drawing said fluid from said chamber and maintaining the latter at a subatmospheric pressure; and fluid-clarifying means in said conduit means for converting said fluid drawn from said chamber into a clean air and permitting the latter to be discharged into the atmosphere.

2. In an electrical-discharge machine having a body of an dielectric liquid flooding a gap between a workpiece and a tool electrode spacedly juxtaposed therewith and means for effecting electrical discharge across said gap to generate combustible and toxic gases rising to the surface of the dielectric liquid, the improvement which comprises:

a. means for collecting said gases immediately above the surface of said body of dielectric liquid and for confining said gases from passage directly to the atmosphere; and b. means for oxidizing the collected and confined gases to render same nontoxic and noncombustible.

3. The improvement defined in claim 2 wherein the means for collecting and confining said gases includes a hood disposed above said body of said dielectric liquid and suction means connected to said hood for drawing gases therefrom.

4. The improvement defined in claim 3 wherein said means for oxidizing said gases includes a body of a catalyst.

5. The improvement defined in claim 4 wherein said suction means is an aspirator, further comprising means for circulating said dielectric liquid through said aspirator.

6. In a method of operating an electric-discharge machining apparatus wherein a spark discharge is repetitively effected across a machining gap between a tool electrode and a metallic workpiece and a body of dielectric liquid floods said gap whereby gases are evolved from said liquid upon discharge between said electrode and said workpiece, the improvement which comprises the steps of:

a. collecting the gases formed from said dielectric liquid immediately above said body thereof and confining the collected gases against direct escape into the atmosphere; and b. treating the collected gases to render same nontoxic and noncumbustible.

7. The improvement defined in claim 6 wherein said gases are collected and confined by juxtaposing a hood closely with the walls of a work tank receiving said body of dielectric liquid, said method further comprising drawing the gases from said hood under suction.

8. The improvement defined in claim 7 wherein said gases are treated by catalytic oxidation.

9. The improvement defined in claim 8 wherein said gases are entrained from said hood in a stream of said dielectric liquid and are separated from said stream prior to treatment.

* * * * *